United States Patent
Zavgren, Jr.

(10) Patent No.: US 7,995,479 B2
(45) Date of Patent: Aug. 9, 2011

(54) SYSTEMS AND METHODS FOR VISUALIZING A COMMUNICATIONS NETWORK

(75) Inventor: John Richard Zavgren, Jr., Acton, MA (US)

(73) Assignees: Verizon Corporate Services Group Inc., Basking Ridge, NJ (US); Level 3 Communications, LLC, Broomfield, CO (US); Raytheon BBN Technologies Corp., Cambridge, MA (US)

( * ) Notice: Subject to any disclaimer, the term of this patent is extended or adjusted under 35 U.S.C. 154(b) by 1409 days.

(21) Appl. No.: 11/126,881

(22) Filed: May 11, 2005

(65) Prior Publication Data

US 2005/0251568 A1    Nov. 10, 2005

Related U.S. Application Data

(63) Continuation of application No. 09/489,517, filed on Jan. 21, 2000, now Pat. No. 6,909,696.

(51) Int. Cl.
*H04J 1/16*    (2006.01)
*H04L 12/26*    (2006.01)

(52) U.S. Cl. ...................................................... 370/237
(58) Field of Classification Search .................... None
See application file for complete search history.

(56) References Cited

U.S. PATENT DOCUMENTS

| | | | |
|---|---|---|---|
| 5,049,873 A * | 9/1991 | Robins et al. ............ 340/825.01 |
| 5,175,800 A * | 12/1992 | Galis et al. ...................... 706/45 |
| 5,437,009 A * | 7/1995 | Lane .............................. 345/636 |
| 5,440,735 A * | 8/1995 | Goldring ........................... 707/8 |
| 5,454,102 A * | 9/1995 | Tang et al. ........................... 1/1 |
| 5,748,098 A | 5/1998 | Grace |
| 6,453,346 B1 * | 9/2002 | Garg et al. ..................... 709/224 |
| 6,516,348 B1 | 2/2003 | MacFarlane et al. |
| 6,625,659 B1 | 9/2003 | Aramizu et al. |
| 6,687,750 B1 | 2/2004 | Messinger et al. |
| 6,920,440 B1 * | 7/2005 | Barson ............................ 706/21 |
| 2002/0021675 A1 * | 2/2002 | Feldmann ..................... 370/254 |

* cited by examiner

*Primary Examiner* — Raj K Jain

(57) ABSTRACT

A system facilitates the visualization of a network having multiple nodes. The system collects information from at least one of the nodes (510). The information describes network operation over a period of time. The system then reconstructs the network operation for the time period from the collected information (520) and presents the reconstructed network operation to an operator (530-550).

14 Claims, 10 Drawing Sheets

SYSTEMS AND METHODS FOR VISUALIZING A COMMUNICATIONS NETWORK

CROSS REFERENCE TO RELATED APPLICATIONS

This application is a continuation of U.S. patent application Ser. No. 09/489,517 by JOHN R. ZAVGREN, Jr. filed Jan. 21, 2000 entitled SYSTEMS AND METHODS FOR VISUALIZING A COMMUNICATIONS NETWORK, the contents of which is hereby incorporated by reference in its entirety.

BACKGROUND OF THE INVENTION

A. Field of the Invention

The present invention relates generally to communications networks and, more particularly, to systems and methods that facilitate monitoring of the operation of a communication network.

B. Description of Related Art

Over the last several years, communication networks have evolved from small unconnected networks to larger interconnected networks. As the larger networks grew in size, it became more difficult to monitor them. In an attempt to address this problem, network developers designed a protocol called the Simple Network Management Protocol (SNMP).

SNMP uses messages, known as protocol data units (PDUs), to monitor network conditions. SNMP uses five types of PDUs: two dealing with reading node data, two dealing with setting node data, and one for monitoring network events, such as node start-ups and shut-downs. To determine whether a node is operating and/or connected to the network, an operator might use SNMP to send a read PDU to that node. If the node is operating and/or connected, the node returns a PDU indicating that it is operating and/or connected. Otherwise, the operator might receive a PDU indicating that the node is inoperative and/or unconnected.

Several problems exist when using SNMP to monitor network conditions. First, SNMP generates network traffic that effects the network conditions that it is used to monitor. Second, SNMP cannot accurately monitor a network that has been partitioned. Third, SNMP cannot easily be incorporated into simulation models.

As a result, a need exists for a network monitoring system that overcomes the deficiencies of conventional monitoring systems, such as SNMP.

SUMMARY OF THE INVENTION

Systems and methods consistent with the present invention address this need by providing a system that monitors and records network conditions in a non-intrusive manner to permit the later reconstruction and visualization of the network as it evolved over time.

In accordance with the purpose of the invention as embodied and broadly described herein, a system facilitates the visualization of a network having multiple nodes. The system collects information from at least one of the nodes. The information describes network operation over a period of time. The system then reconstructs the network operation for the time period from the collected information and presents the reconstructed network operation to an operator.

In another implementation consistent with the present invention, a computer-readable memory device of a node in a network contains a network operations data structure. The memory device includes a first area that stores information regarding node status changes, a second area that stores information regarding messages received and transmitted by the node, and a third area that stores information regarding link status changes in the network.

In yet another implementation consistent with the present invention, an interactive graphical user interface facilitates the visualization of a network having multiple nodes. The graphical user interface includes a network topology diagram configured to display at least some of the nodes, links connecting the nodes, and messages transmitted through the network, and replay controls that permit an operator to control a replay sequence of the network as the network operates over a period of time.

In a further implementation consistent with the present invention, a method for visualizing a network, having multiple nodes, includes recording network events by each of the nodes over a period of time, collecting the recorded events from the nodes, recreating operation of the network over the time period from the recorded events, and displaying the recreated network operation.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention monitor network activity in a non-intrusive manner by recording the network activity, as it occurs, in the local memories of nodes in the network. The systems and methods reconstruct the network activity from the information stored in the node memories to facilitate visualization of the network as it evolved over time.

EXEMPLARY NETWORK

Figure 1:
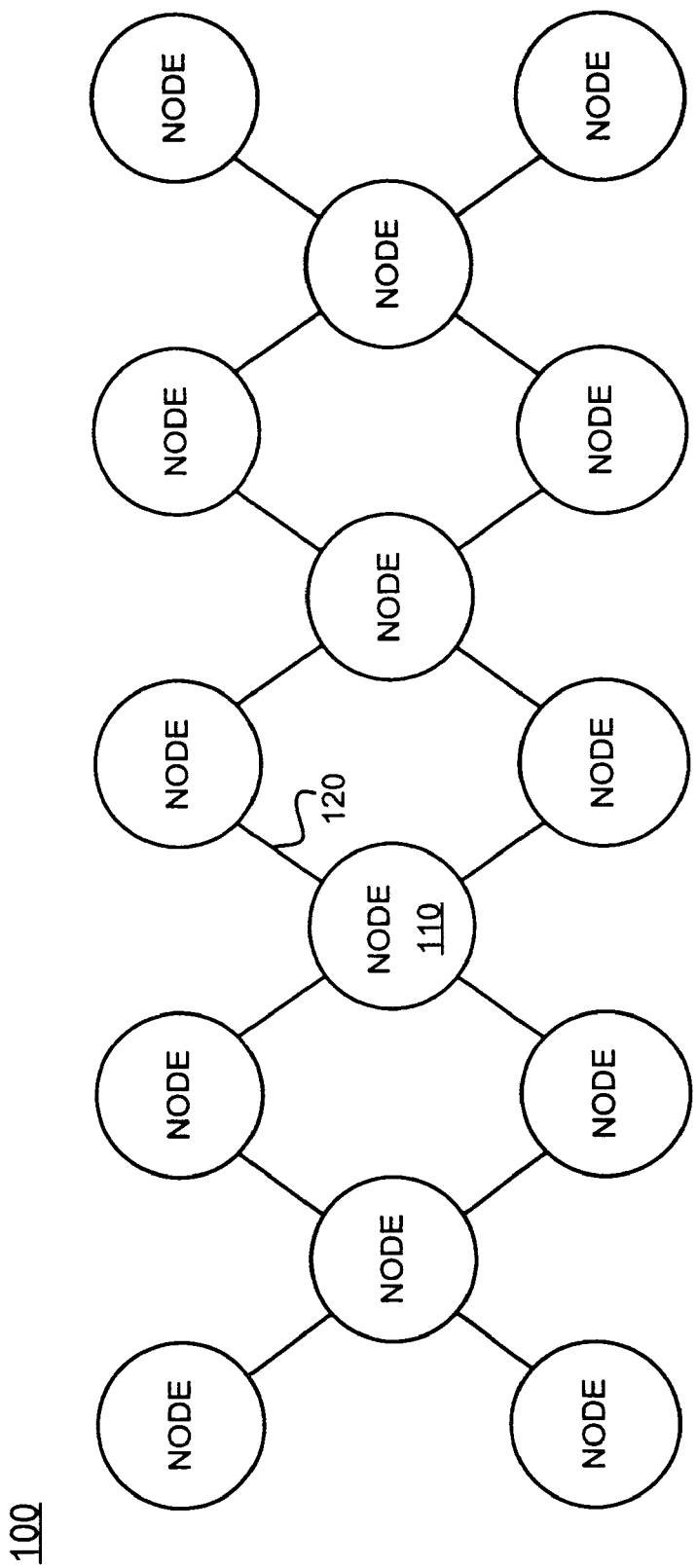
FIG. 1 is a diagram of an exemplary network in which systems and methods consistent with the present invention may be implemented.

FIG. 1 is an exemplary network 100 in which systems and methods consistent with the present invention may be implemented. The network 100 includes multiple interconnected nodes 110. In one implementation consistent with the present invention, the network 100 is partitioned into one or more clusters of one or more nodes 110 in a conventional manner. The nodes 110 in the clusters may be referred to as "cluster members" and one or more of the nodes 110 in each of the clusters may function as a "cluster head" (e.g., a backbone node). The partitioning of a network and the operation of a partitioned network are known to those skilled in the art and, therefore, will not be described further.

Each node 110 connects to neighboring nodes 110 via network links 120. The nodes 110 may include network routers that send messages through the network 100 over the links 120 from a source host to a destination host. The links 120 may include any conventional transmission medium, such as wired, wireless, or optical transmission mediums.

Figure 2:
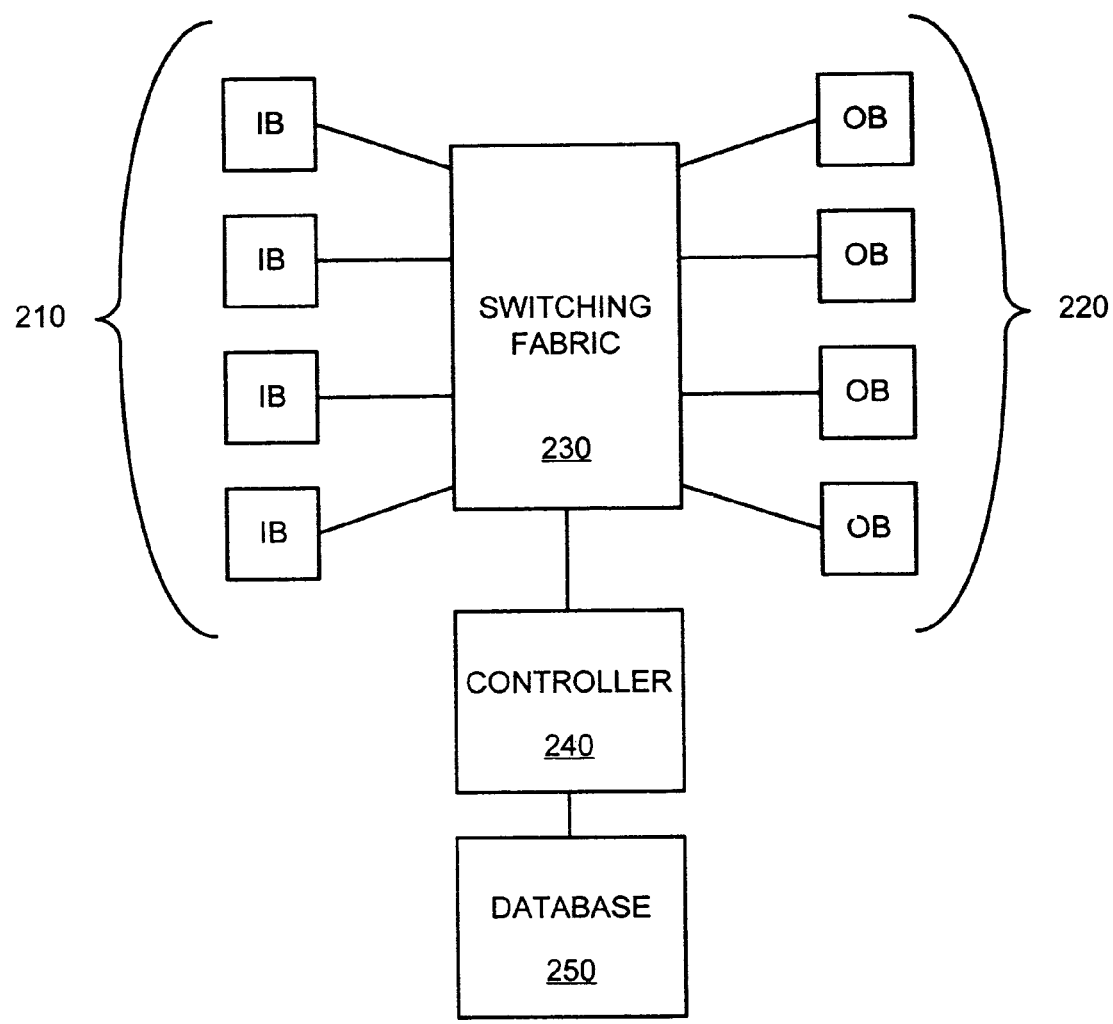
FIG. 2 is an exemplary diagram of a node in the network of FIG. 1.

FIG. 2 is an exemplary diagram of a node 110 in an implementation consistent with the present invention. The node 110 includes multiple input buffers 210, multiple output buffers 220, a switching fabric 230, a controller 240, and a database 250. The input buffers 210 temporarily store received messages, and the output buffers 220 temporarily store messages for transmission.

The switching fabric 230 may include a conventional switching fabric to connect the input buffers 210 to the output buffers 220. The controller 240 controls the operation of the node 110. The controller 240 may include a processor, microprocessor, digital signal processor, etc. that analyzes incoming messages and configures the switching fabric 230 to send the messages to the appropriate output buffers 220. The controller 240 may also record information regarding network conditions in the database 250. The database 250 may include a dynamic storage device, such as a random access memory (RAM), or a type of magnetic or optical recording medium and its corresponding drive.

Figure 3:
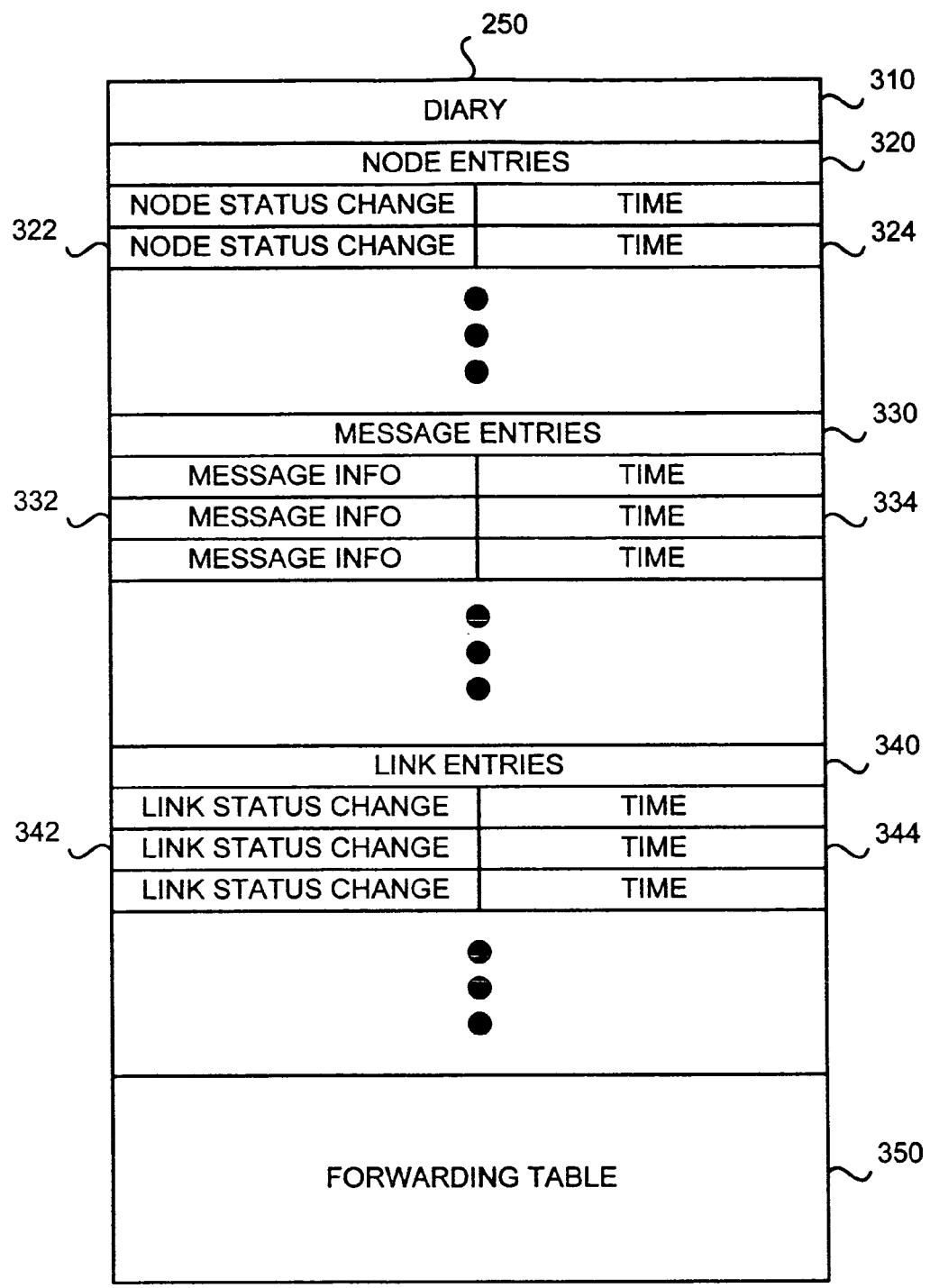
FIG. 3 is an exemplary diagram of the database of FIG. 2.

FIG. 3 is an exemplary diagram of the database 250 in an implementation consistent with the present invention. The database 250 may include a diary 310 and a forwarding table 350. The diary 310 may include node entries 320, message entries 330, and link entries 340. Each of the node entries 320 includes a node status change data field 322 and a time stamp field 324. The node status change data field 322 stores information corresponding to meaningful events, such as when the node 110 moves or changes in any significant manner (e.g., whenever it updates its forwarding table 350 or changes its status in the network hierarchy). The time stamp field 324 stores the time upon which the event occurred. To make the time stamp more meaningful, the nodes 110 may synchronize their clocks using, for example, the Internet standard Network Time Protocol.

Each of the message entries 330 includes a message information field 332 and a time stamp field 334. The message information field 332 stores information corresponding to a received or sent message. Each time that the node 110 receives or sends a message, it creates a new message entry 330. The time stamp field 334 stores the time upon which the message was received or sent.

Each of the link entries 340 includes link status change data field 342 and a time stamp field 344. The link status change data field 342 stores information regarding a link attribute change (e.g., the link is brought down, brought up, or its metric changes). The time stamp field 344 stores the time upon which the link attribute change occurred.

The forwarding table 350 includes a conventional routing table for forwarding messages through the network 100. The forwarding table 350 may store information on node-interconnection and/or paths through the network 100. A node 110 may change its forwarding table 350 upon the occurrence of certain network events, such as when nodes 110 or links 120 change state.

EXEMPLARY COMPUTER SYSTEM

Figure 4:
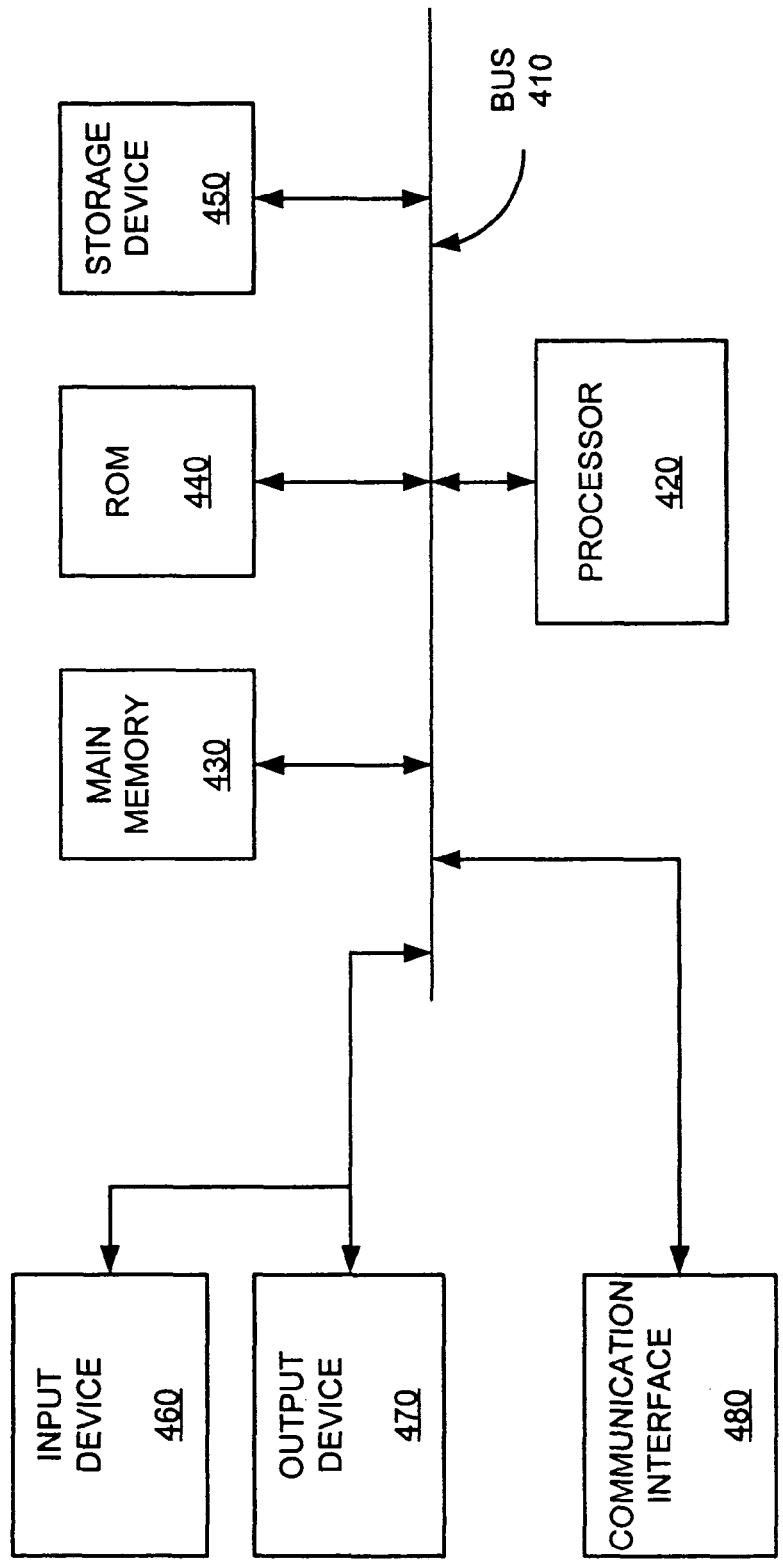
FIG. 4 is a detailed diagram of an exemplary computer system upon which systems and methods consistent with the present invention may be implemented.

FIG. 4 is an exemplary diagram of a computer system 400 upon which systems and methods consistent with the present invention may be implemented. The system 400 may be a stand-alone device or may be a device accessible by an operator over a network, such as the Internet.

The system 400 may include a bus 410, a processor 420, a main memory 430, a read only memory (ROM) 440, a storage device 450, an input device 460, an output device 470, and a communication interface 480. The bus 410 permits communication among the components of the system 400.

The processor 420 may include any type of conventional processor or microprocessor that interprets and executes instructions. The main memory 430 may include a RAM or another dynamic storage device that stores information and instructions for execution by the processor 420. The ROM 440 includes a ROM or another type of static storage device that stores static information and instructions for use by the processor 420. The storage device 450 may include a magnetic and/or optical recording medium and its corresponding drive.

The input device 460 may include any conventional mechanism that permits an operator to input information to the system 400, such as a keyboard, a mouse, a pen, voice recognition and/or biometric mechanisms, etc. The output device 470 may include any conventional mechanism that outputs information to the operator, including a display, a printer, a pair of speakers, etc. The communication interface 480 may include any transceiver-like mechanism that enables the system 400 to communicate with other devices and/or systems. For example, the communication interface 480 may include mechanisms for communicating with another device or system via a network.

As will be described in detail below, a computer system 400, consistent with the present invention, facilitates the visualization of a network as it evolved over time. The computer system 400 performs these tasks in response to processor 420 executing sequences of instructions contained in, for example, memory 430. Such instructions may be read into memory 430 from another computer-readable medium, such as the data storage device 450, or from another device via the communication interface 480.

Execution of the sequences of instructions contained in memory 430 causes processor 420 to perform processes that will be described later. Alternatively, hardwired circuitry may be used in place of or in combination with software instructions to implement processes consistent with the present invention. Thus, the present invention is not limited to any specific combination of hardware circuitry and software.

EXEMPLARY SYSTEM PROCESSING

Figure 5:
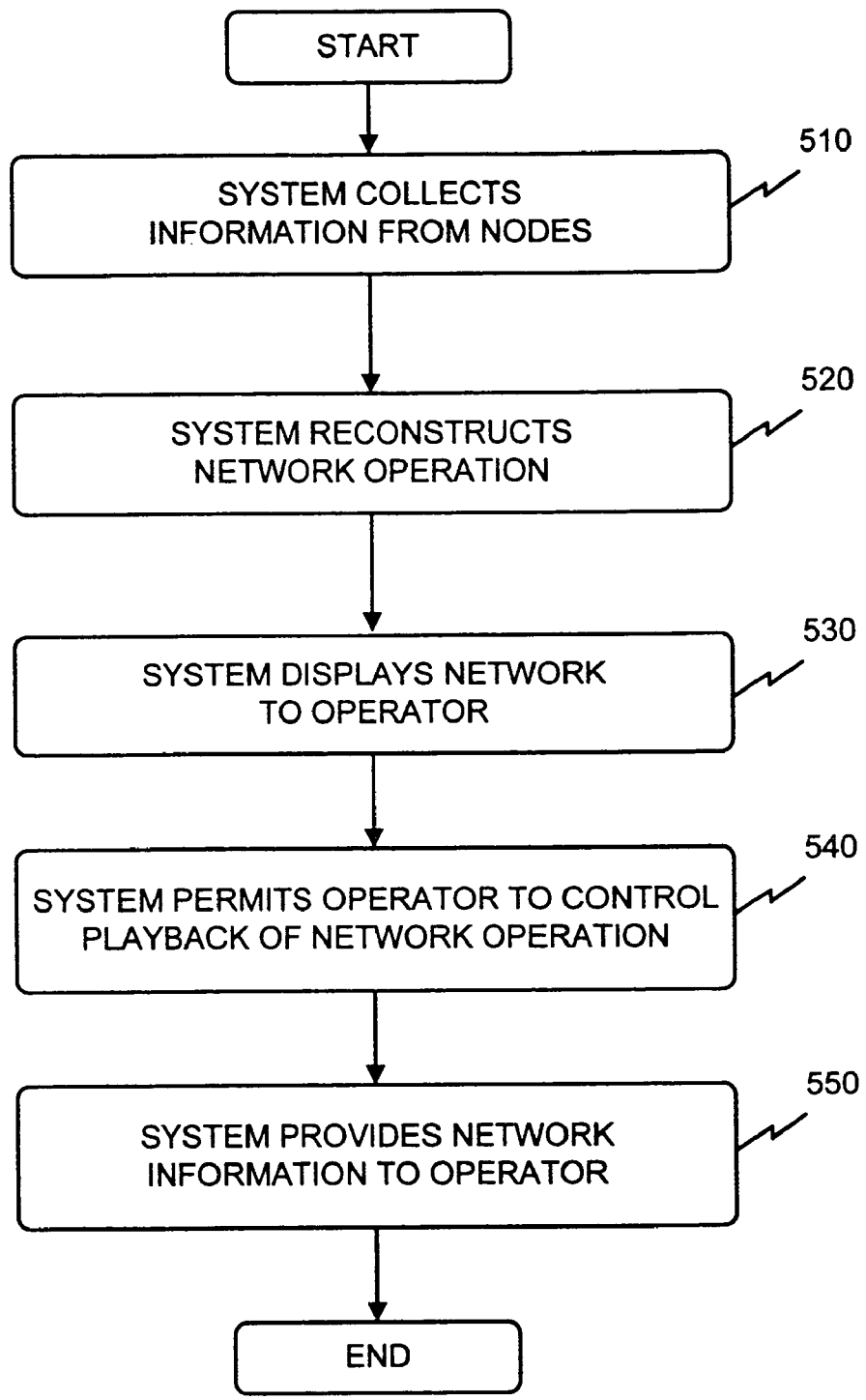
FIG. 5 is a flowchart of processing, consistent with the present invention, for visualizing network operation.

FIG. 5 is a flowchart of processing, consistent with the present invention, for visualizing a network as it evolved over time. As the network 100 operates during, for example, a network experiment, the nodes 110 record network events in their diaries 310 (FIG. 3). For example, the nodes 110 record information regarding changes in their own status, changes in link attributes, and messages that they receive and send.

To permit recreation of the network operation, the system 400 collects information from the node databases 250 (i.e., the diaries 310 and the forwarding tables 350) and stores the information in its memory (e.g., main memory 430) [step 510]. From the diary 310 information, the system 400 reconstructs the network operation [step 520]. The system 400 may combine the diary 310 information from each of the nodes and sort it by time to establish a complete record of the network operation. The system 400 may also construct its own forwarding tables using the diary 310 information.

The system 400 displays the network topology with the actual node positions to an operator via a graphical user interface [step 530]. The system 400 reconstructs the network as it evolved over time and permits the operator to manipulate the playback of the network operation via the graphical user interface [step 540]. For example, the system 400 may permit the operator to fast forward, rewind, step forward or backward, etc. to visualize the network as it evolved over time. In addition to allowing the operator to monitor the network operation, the system 400 may provide detailed information to the operator regarding any node, message, or link included in the network [step 550].

During playback, the system 400 compares the forwarding tables, as logged by the nodes, against the forwarding tables that the system 400 constructs. The comparison reveals when nodes have incorrect forwarding tables and permits the convergence time of the routing protocol to be measured. The convergence time of the routing protocol indicates the time it takes the nodes to react to an event and update their forwarding tables.

Figure 6:
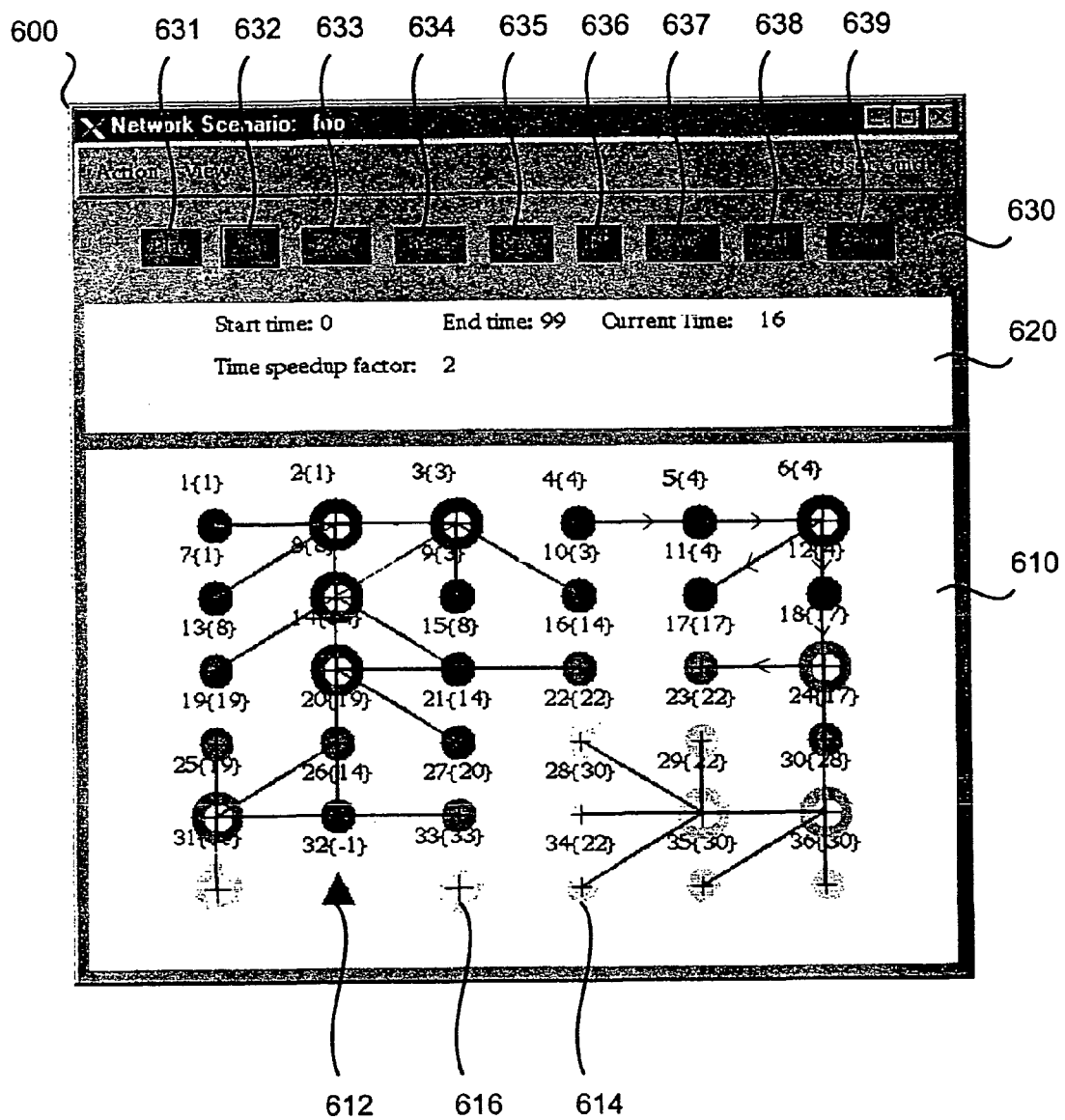
FIG. 6 is an exemplary diagram of a graphical user interface that may be presented by the system of FIG. 4.

FIG. 6 is an exemplary diagram of a graphical user interface 600 that may be presented by the system 400. The graphical user interface 600 may include a network topology diagram 610, a replay information area 620, and replay controls 630. The network topology diagram 610 shows at least some of the nodes comprising the network under consideration. The node icons indicate the status of the nodes: the triangle 612 indicates that the node is unavailable; the small circle 614 indicates that the node is a cluster member; and the larger circle 616 indicates that the node is a cluster head. The network topology diagram 610 also shows message transmissions and receptions along with the attributes of existing links.

The replay information area 620 provides information to an operator regarding the time at which the network shown by the network topology diagram 610 operates. For example, the network topology 610 represents the network at time 16 in FIG. 6.

The replay controls 630 permit the operator to control the playback of the network operation. The controls 630 may include "play" 631, "forward" 632, "backward" 633, "reset" 634, "rewind" 635, "fast forward" 636, "pause" 637, "quit" 638, and "print" 639. Different controls may also be possible.

Play 631 commences playback of the network operation. Forward 632 and backward 633 permit the network operation to be stepped forward or backward, respectively. Reset 634 resets the network operation to the beginning of the playback sequence. The rewind 635 and fast forward 636 permit the network operation to be sped backward or forward, respectively. Pause 637 and quit 638 pauses and quits, respectively, the current playback sequence. Print 639 permits the network topology diagram 610 to be printed for the operator.

Figure 7A:
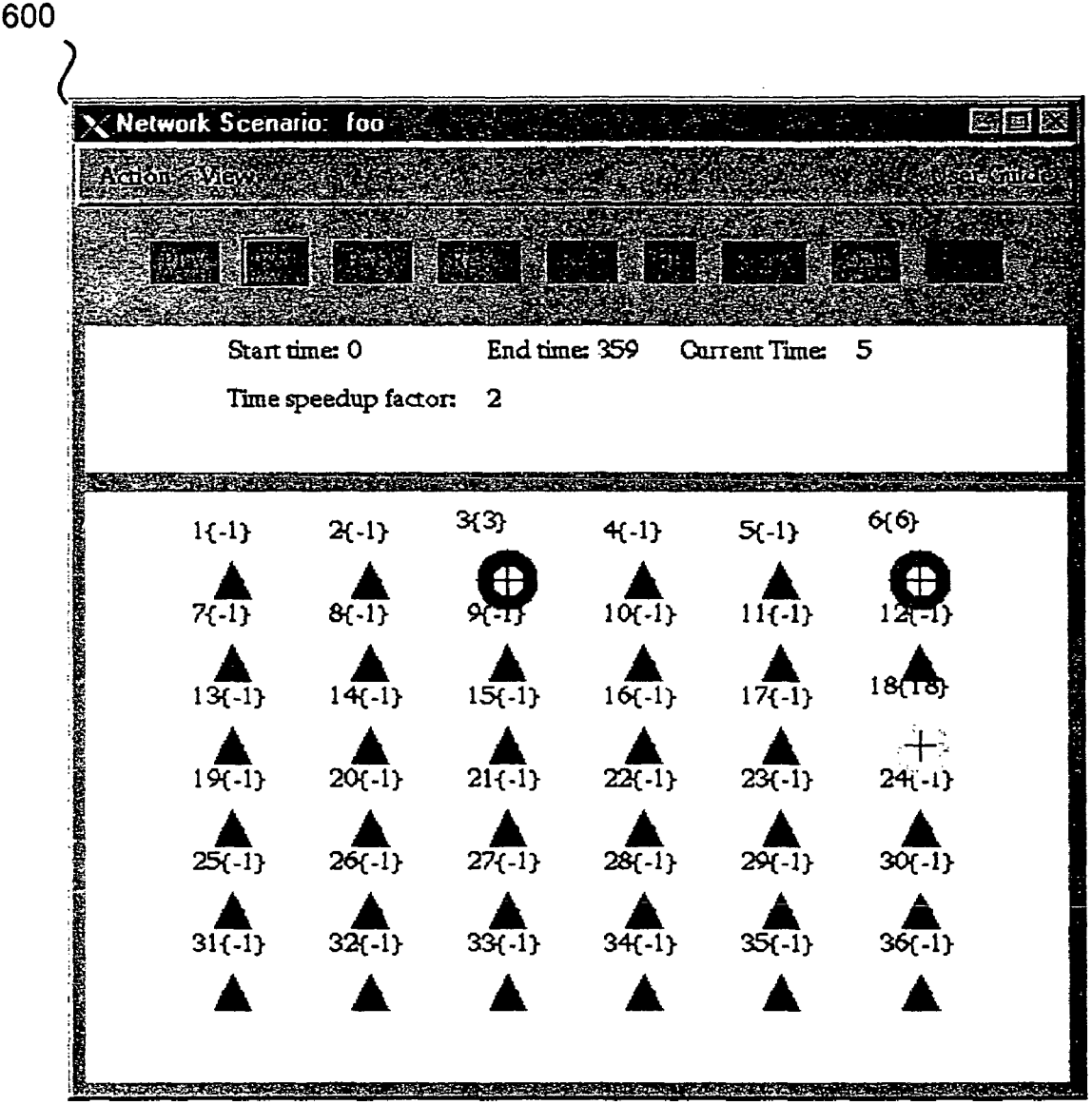
FIGS. 7A-7C are exemplary diagrams of the graphical user interface of FIG. 6 at various times during a network playback sequence.
Figure 7B:
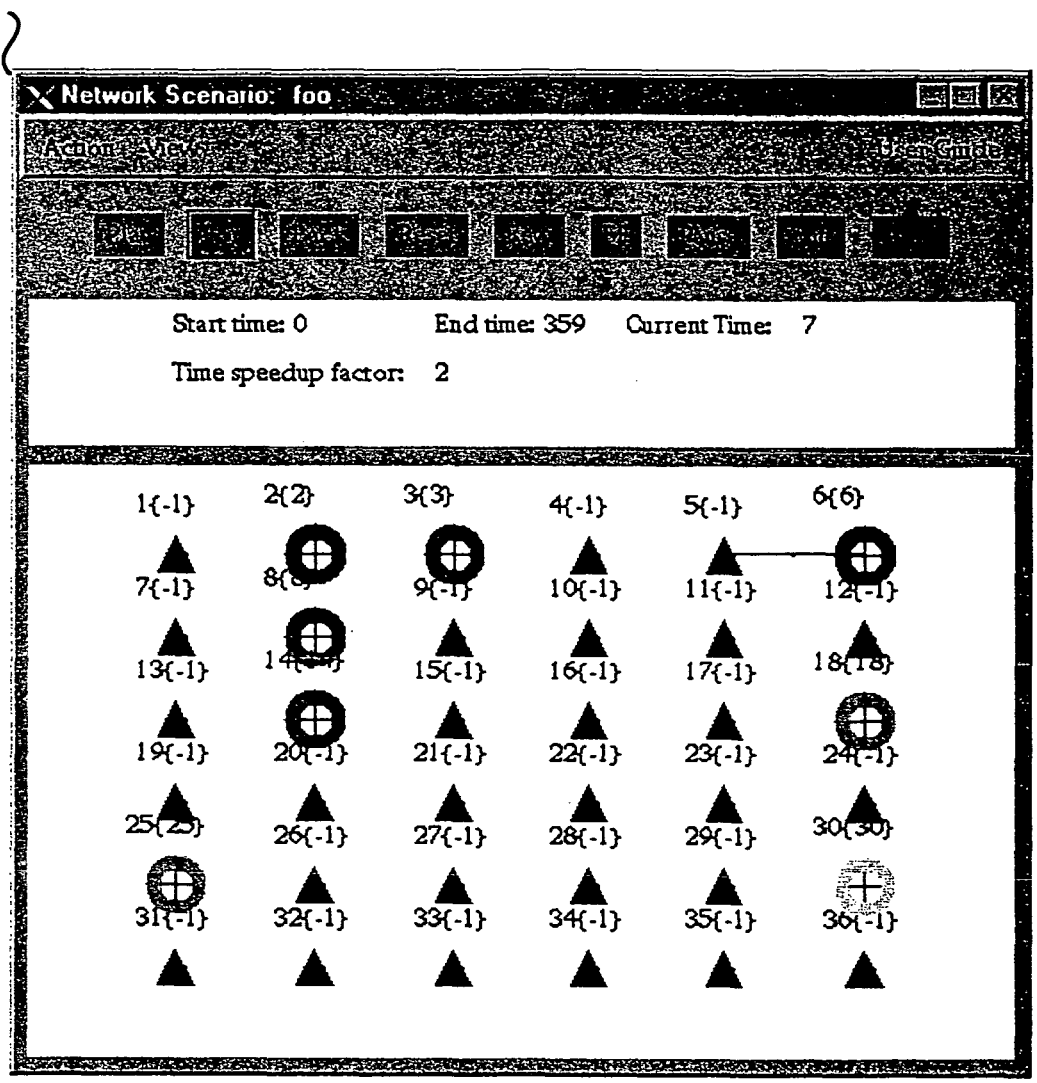
Figure 7C:
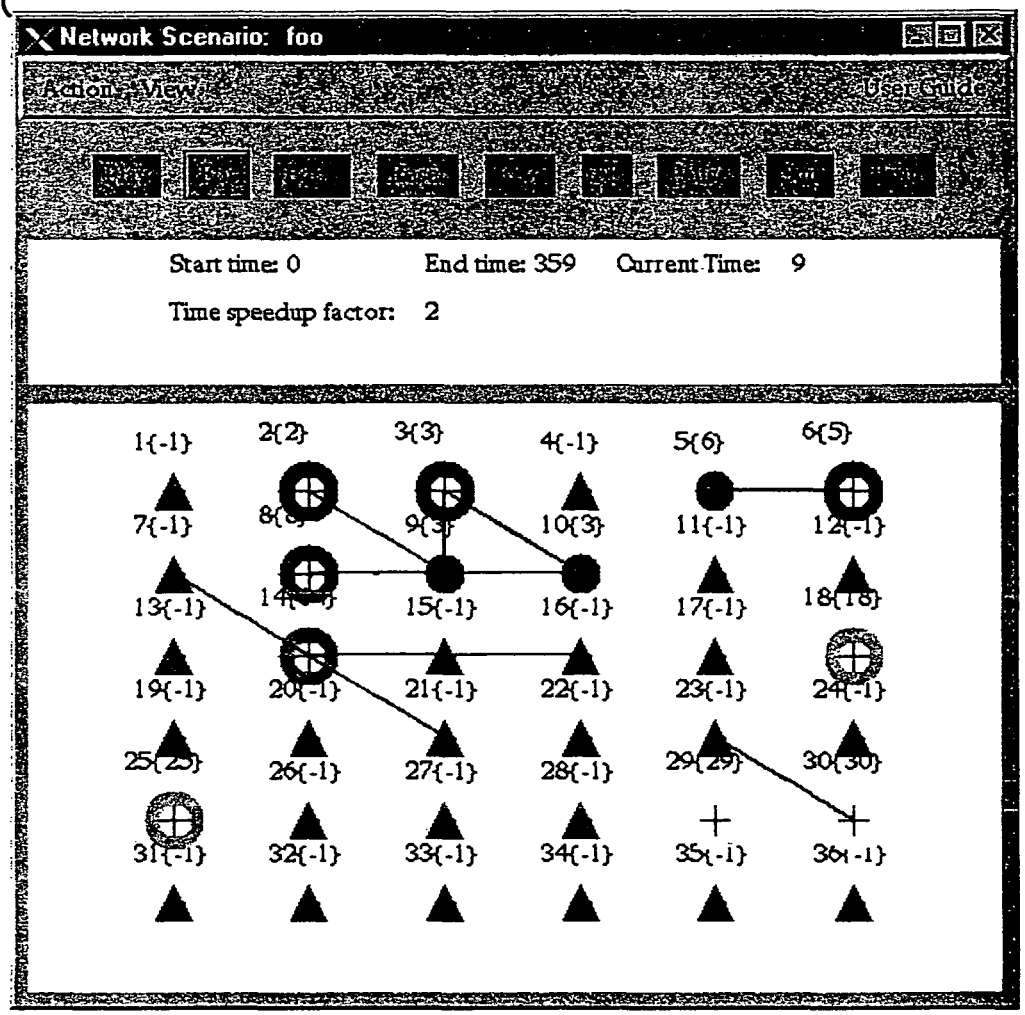

FIGS. 7A-7C are exemplary diagrams of the graphical user interface 600 at various times during the network playback sequence. FIG. 7A shows the network at time 5. At this time, only two nodes are active in the network: nodes 3 and 6. These nodes are cluster heads. FIG. 7B shows the network at time 7. At this time, a link exists between nodes 5 and 6 and a few more nodes have become cluster heads. FIG. 7C shows the network at time 9. At this time, several additional nodes have become active, some as cluster heads and some as cluster members. Also, many additional links exist between the nodes.

If at any time, the operator desires additional information regarding a node, a message, or a link, the operator need only specify the node, message, or link. The operator may do so by selecting the node, message, or link on the topology diagram 610 using conventional mechanisms, such as a mouse. For example, the operator may obtain information regarding a node, such as its forwarding table, information regarding a link, such as the metrics that have been assigned to it by the end-point nodes, or information regarding a message, such as its source and destination attributes, the protocol that created it, its contents, etc.

Figure 8:
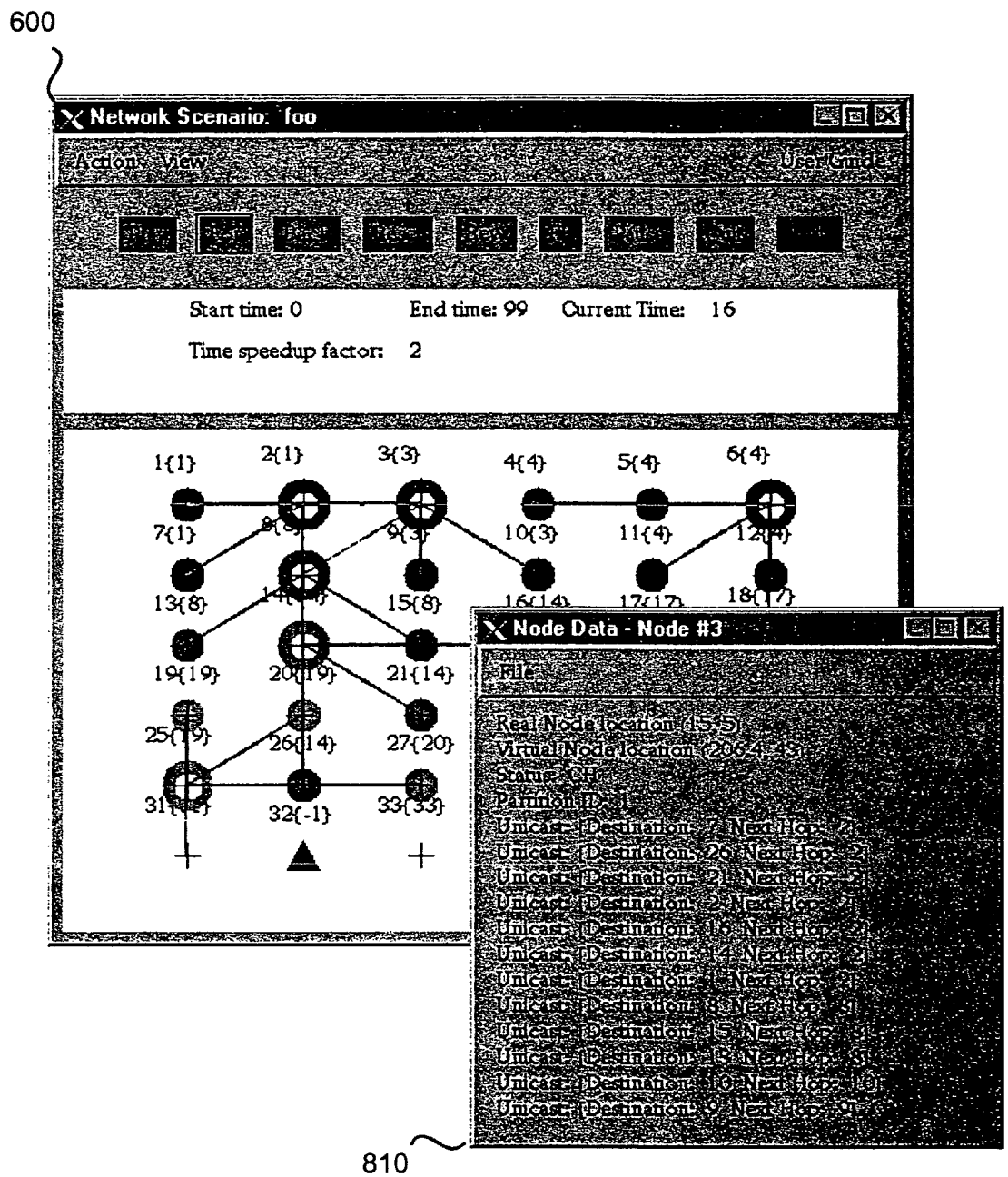
FIG. 8 illustrates the graphical user interface of FIG. 6 in response to an operator indicating a desire for information regarding a node in the network.

FIG. 8 illustrates the graphical user interface 600 in response to an operator indicating a desire for information regarding a node in the network. Assume that the operator specified a desire for information regarding node 3. In response, the system 400 accesses the diary and forwarding table information in its memory and displays the information that corresponds to node 3, possibly in a separate window 810.

CONCLUSION

Systems and methods consistent with the present invention monitor network operations in a non-intrusive manner and reconstruct the network for manipulation by an operator. As such, the following advantages may be obtained:

a) The network monitoring has no effect on network performance. By contrast, SNMP creates traffic (in the way of messages) that can impact the network performance and skew measurements.

b) The evolution of unicast and multicast routes can easily be observed.

c) Node utilization can be measured (i.e., the fraction of resources that are being used to forward application-layer datagrams, and send and receive routing updates and neighbor discovery beacons).

d) Because the individual nodes collect information regarding network events, network impairments do not affect the ability to visualize and measure the network. By contrast, in an SNMP-based system, network partitions prevent events that occur on two different sides of a partition from being observed.

e) Network operations can be reconstructed and routing protocol convergence time can be measured.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method comprising:
for each of a plurality of nodes on a network, storing message entries in a database on the respective node, the entries including information corresponding to messages received and transmitted by the respective node and including time stamps for the messages;
collecting the message entries from each of the databases;
storing the collected message entries in a memory;
recreating operation of the network over a time period from the collected message entries, said recreating including combining the message entries from multiple ones of the plurality of nodes and sorting the combined entries by certain of said time stamps associated with the combined entries; and displaying the recreated network operation by displaying a representation and status of the plurality of nodes, and a representation of message traffic between the plurality of nodes.

2. The method of claim 1, wherein the step of storing includes:

generating a time stamp for each of the messages.

3. The method of claim 2, further comprising providing more detailed information about at least one of said nodes in response to an instruction from an operator, wherein the detailed information includes data corresponding to at least one of a node status change, a link status change, a sent message, a received message, a node interconnection, and a network path between nodes.

4. The method of claim 1, wherein the plurality of nodes also store network events, and a first one of the network events stored in a first one of the databases is different than a second one of the network events stored in a second one of the databases.

5. The method of claim 1, further comprising creating a forwarding table from the collected message entries.

6. The method of claim 5, further comprising collecting forwarding tables from multiple ones of the plurality of nodes and comparing the collected forwarding tables to the forwarding table created from the collected message entries.

7. A computer readable storage medium having computer executable instructions executable by a processor for:

collecting, from each of a plurality of nodes on a network, message entries including information corresponding to messages received and transmitted by the respective node and including time stamps for the messages;

storing the collected message entries in a memory;

recreating operation of the network over a time period from the collected message entries, said recreating including combining the message entries from multiple ones of the plurality of nodes and sorting the combined entries by certain of said time stamps associated with the combined entries; and displaying the recreated network operation by displaying a representation and status of the plurality of nodes, and a representation of message traffic between the plurality of nodes.

8. The computer readable storage medium of claim 7, wherein the instructions for storing includes instructions for:

generating a time stamp for each of the messages.

9. The computer readable storage medium of claim 8, wherein the instructions for recreating include instructions for:

combining the collected message entries for the nodes; and sorting the collected message entries based on the generated time stamps.

10. The computer readable storage medium of claim 8, further comprising instructions for providing more detailed information about at least one of said nodes in response to an input from an operator, wherein the detailed information includes data corresponding to at least one of a node status change, a link status change, a sent message, a received message, a node interconnection, and a network path between nodes.

11. The computer readable storage medium of claim 7, wherein the plurality of nodes also store network events, and a first one of the network events stored in a first one of the databases is different than a second one of the network events stored in a second one of the databases.

12. The computer readable storage medium of claim 7, further comprising creating a forwarding table from the collected message entries.

13. The computer readable storage medium of claim 12, further comprising collecting forwarding tables from multiple ones of the plurality of nodes and comparing the collected forwarding tables to the forwarding table created from the collected message entries.

14. A method comprising:

for each of a plurality of nodes on a network, storing message entries in a database on the respective nodes, the entries including information corresponding to messages received and transmitted by the respective nodes and including time stamps for the messages;

collecting the message entries from each of the databases;

collecting forwarding tables from multiple ones of the plurality of nodes;

storing the collected message entries and the collected forwarding tables in a memory;

creating a forwarding table from the collected message entries; and comparing the collected forwarding tables to the created forwarding table.

* * * * *